Patented Nov. 17, 1931

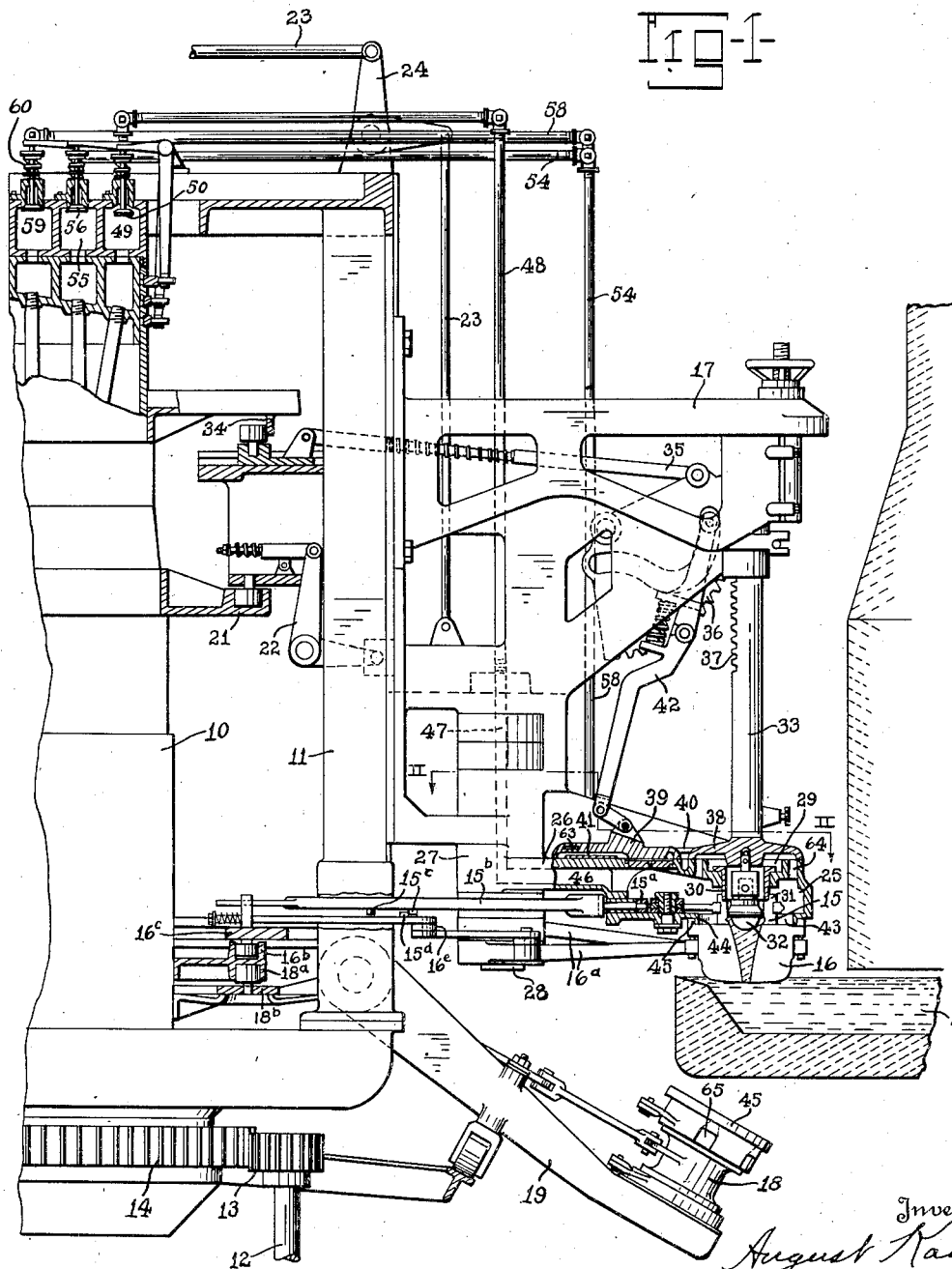

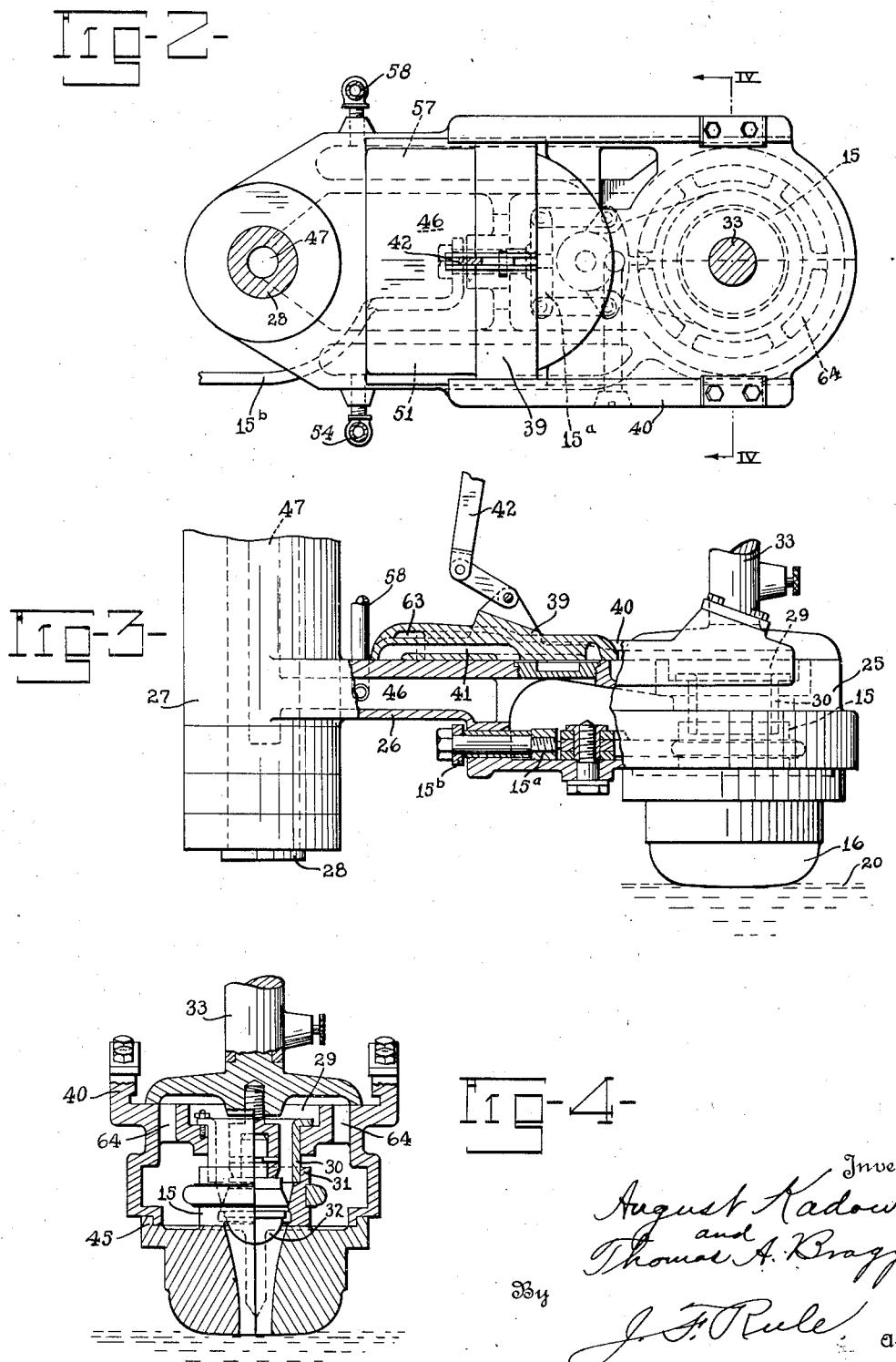

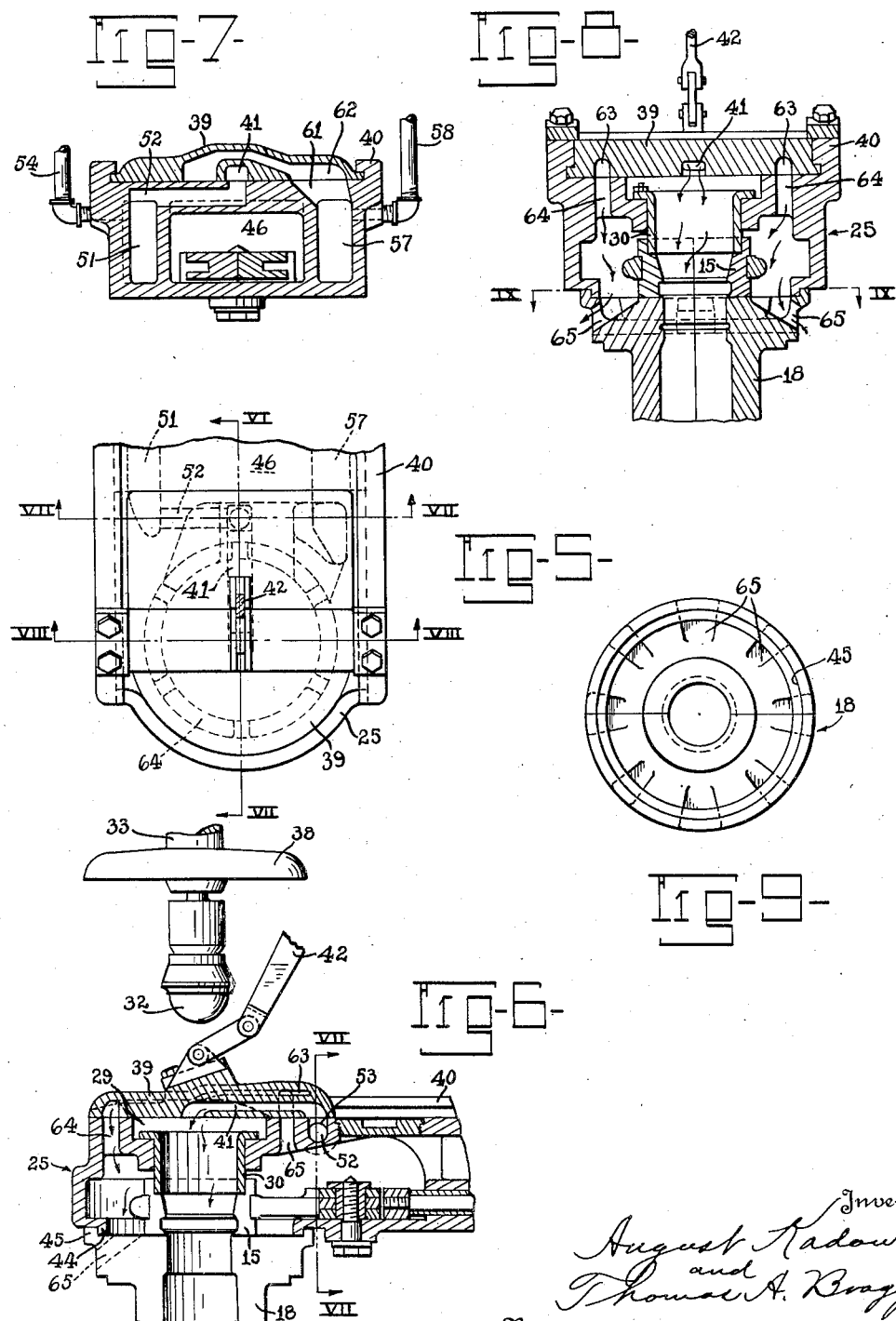

1,832,810

UNITED STATES PATENT OFFICE

AUGUST KADOW AND THOMAS A. BRAGG, OF TOLEDO, OHIO, ASSIGNORS TO OWENS-ILLINOIS GLASS COMPANY, OF TOLEDO, OHIO, A CORPORATION OF OHIO

MACHINE FOR FORMING HOLLOW GLASSWARE

Application filed July 10, 1929. Serial No. 377,146.

The present invention relates to improvements in machines for forming hollow glassware and more particularly to that type embodying a series of partible body blank molds which are successively brought into contact with a supply body of molten glass and gather mold charges by suction.

In machines of the type referred to above, the body blank mold ordinarily comprises two sections adapted to cooperate with a two-section partible neck mold in gathering mold charges and transforming the latter into blanks or parisons. In gathering a mold charge from the supply body of molten glass, it is necessary to exhaust the air from the cavities of the neck and body blank molds while the open lower end of the body blank mold is in contact with the glass. Whether the cavities are completely filled with glass is dependent to a considerable degree upon conditions at the parting lines of the mold sections and between the two molds. Ordinarily, the neck mold joints and abutting surfaces of the neck and body blank molds are exposed to the outside air and, therefore, require extremely accurate machining in order to minimize the leakage of vacuum.

An object of the present invention is to provide means to materially reduce, if not entirely eliminate, loss of vacuum in the manner indicated above. To this end each neck mold during gathering of mold charges is entirely enclosed in a head or chamber from which the air is exhausted. In this manner the joints between the sections of the neck mold and the abutting ends of the neck mold and body blank mold are no longer sealing surfaces and, therefore, do not affect gathering of charges of the molten glass as heretofore.

Another object is to provide means to avoid production of glassware, such as bottles and jars, with offset neck portions. To this end the vacuum chamber or head referred to above is arranged to function as a centering device, insuring proper alignment of the neck mold with the body blank and finishing molds in alteration.

A further object is to provide improved means for applying cooling air to the neck molds. According to the present invention, cooling air may be directed into the vacuum chamber and onto the neck mold at any time following completion of the exhaust of air from said chamber, and continued up to a point just ahead of the charge gathering station. Thus, exceptionally effective and prolonged application of cooling air to the neck mold and adjacent parts is obtainable.

Other objects will be apparent hereinafter.

In the drawings:

Fig. 1 is a sectional elevation illustrating our invention embodied in one head or mold group of a glassware blowing machine.

Fig. 2 is a horizontal sectional plan view taken along the line II—II of Fig. 1.

Fig. 3 is a detail side elevation with parts in section.

Fig. 4 is a sectional view taken substantially along the line IV—IV of Fig. 2.

Fig. 5 is a fragmentary plan view.

Fig. 6 is a sectional view taken substantially along the line VI—VI of Fig. 5, showing the plunger retracted.

Fig. 7 is a transverse sectional view taken substantially along the line VII—VII of Figs. 5 and 6.

Fig. 8 is a sectional view taken along the line VIII—VIII of Fig. 5.

Fig. 9 is a top plan view of a finishing mold, the view being taken substantially along the line IX—IX of Fig. 8.

The machine in conjunction with which our invention is illustrated is of conventional type and comprises a stationary column rotatively supporting a mold carriage 11. The mold carriage is constantly rotated by means of a motor (not shown) operating through a shaft 12, pinion 13 and a ring gear 14, the latter secured to the lower portion of the mold carriage. An annular series of mold groups or units mounted on the mold carriage, are moved in succession, due to the rotation of the latter, past a series of stations where the usual well known operations take place in transforming mold charges of molten glass into finished articles of glassware.

Each mold group or unit comprises a dipping frame 17 mounted for vertical sliding movement upon the mold carriage 11. Neck and body blank molds 15 and 16, respectively, are supported at the lower end of the dipping frame 17 and are alternately raised and lowered with the latter. By lowering the dipping frames 17 one at a time, while over the supply body of molten glass 20, the open lower ends of the body blank molds 16 are successively brought into charge gathering contact with the surface of the glass. While the molds are in contact with the glass as above stated, air is exhausted from the mold cavities and replaced with measured quantities of molten glass. This feature will be referred to hereinafter. Each dipping frame is alternately raised and lowered by mechanism including a stationary cam 21 supported upon the central column and operated through a bell crank lever 22 which is suitably connected to the frame 17. Counterweights (not shown) are connected through rods 23 and a bell crank lever 24 to the dipping frame 17 and assist in moving the latter to its uppermost position.

In providing for a material reduction or entire elimination of the loss of vacuum through the joints in the neck molds, the latter are enclosed in vacuum chambers 25 or heads arranged at the lower ends of the dipping frames 17. Each vacuum chamber or head is connected through an arm 26 to a collar 27 which is mounted upon a vertical hinge pin 28 suitably supported upon the dipping frame 17. A vertical opening 29 formed in the upper wall of the vacuum chamber 25 opens into the interior of the latter. This opening is in register with a vertical opening 43 in the lower side of the chamber, the latter opening registering alternately with the body blank and finishing molds. An adapter ring 30 or collar is arranged in said upper opening 29 and occupies a fixed position in the chamber with its lower end projecting a short distance into the latter and functioning as a centering device for the neck mold 15 as will be apparent presently. The neck mold 15 including a pair of sections is provided with an upstanding flange 31 or shoulder which contacts with the outer surface of the inwardly extended end portion of the adapter when the neck mold 15 is closed.

The bottom opening 43 in the vacuum chamber 25 or head extends vertically through the lower wall and is defined by a depending annular flange 44. This opening 43 is of substantially the same diameter as the upstanding flanges 45 on the body blank and finishing molds 16 and 18 respectively, said flanges 45 or shoulders adapted for sealing contact with the outer surface of the flange 44 at regular time intervals. Thus, the body blank and finishing molds function alternately to close the bottom of the opening 43 in the chamber 25.

The opening 29 in the upper wall of the vacuum head or chamber 25 is alternately closed by a cap plate 38 and blow slide 39. The cap plate 38 carries a plunger 32 adapted to cooperate with the neck mold 15 at regular time intervals in forming a neck or finish cavity. This plunger is moved into and out of the neck mold at regular time intervals by means of a stationary cam 34 operating through a link 35 and a gear segment 36, the latter running in mesh with a rack bar 37 formed on the plunger rod 33.

The blow slide 39 referred to above is mounted in a slideway 40 extending lengthwise of the upper side of the arm 26 and vacuum chamber 25 and is adapted to replace the cap plate 38 at regular time intervals, preparatory to final expansion of the blank or parison in the finishing mold. Movement of the blow slide 39 may be obtained by the use of ordinary mechanism (Fig. 1) including a lever 42 pivoted to the blow slide and having suitable connection to the gear segment 36.

Alternate opening and closing of the partible body blank mold 16 (Fig. 1) which is connected to the vertical hinge pin 28 through arms 16ª, is obtained by mechanism including a stationary cam 16ᵇ arranged to impart radial horizontal movement to a slide 16ᶜ, the latter connected through a rod 16ᵈ and toggle links 16ᵉ to the mold arms 16ª. Radial movement of the slide 16ᶜ alternately opens and closes the body blank mold. The neck mold 15 (Figs. 1 and 2) is connected through toggle links 15ª to a rod 15ᵇ arranged above the rod 16ᵈ. A pair of stops 15ᶜ (Fig. 1) on the rod 15ᵇ are arranged to be engaged one at a time by a finger 15ᵈ at predetermined time intervals to thereby alternately open and close the neck mold. The finishing mold 18 is alternately opened and closed by a cam 18ª operating through a slide 18ᵇ.

While a blank mold is in contact with the supply body of molten glass 20, air is exhausted from the mold cavity and chamber 25 for the purpose of gathering a mold charge. This is accomplished by providing a passageway 46 (Figs. 1, 2, 3 and 7) extending lengthwise of the arm 26, said passageway being arranged centrally of the arm and communicating at its inner end with a conduit 47 extending upwardly through the hinge pin 28 to a pipe 48 which leads to a vacuum chamber 49 in the upper end of the stationary central pillar 10. A cam controlled valve 50 regulates the application of vacuum to the molds.

Air under pressure for expanding the blanks or parisons, is supplied to the molds at proper time intervals by way of a passageway 51 (Figs. 2, 5, 7 and 8) which communicates directly with the finishing mold cavity by way of the passageway 41 in the blow slide 39 when the latter is in its outermost position. The passageway 51 opens into a transverse conduit 52 at its outer end and by way of an upwardly opening port 53 communicates with said passageway 41 in the blow slide 39. The other end of the passageway 51 (Figs. 2 and 7) is connected to a supply pipe 54 leading to a chamber 55 containing air under high pressure. A cam controlled valve 56 regulates the application of air under high pressure to the molds.

Cooling air is supplied to the chamber 25 for the purpose of lowering the temperature of the neck mold 15 and associated parts by way of a passageway 57 (Figs. 2, 5 and 7) extending lengthwise of the arm 26 at one side of the vacuum passageway 46. One end of the passageway 57 is connected to a supply pipe 58 which extends upwardly to a chamber 59 containing air under low pressure. A cam controlled valve 60 regulates the passage of air from the chamber 59 to the pipe 58. The outer end of the passageway 57 (Figs. 2 and 5) is formed with an upwardly opening port 61, the latter adapted for register with a port 62 in the lower side of the blow slide 39 when the latter is in its outermost position. This port 62 in the blow slide leads to a circular channel 63 in the lower side of the slide 39, said channel communicating with the interior of the chamber 25 by way of an annular series of vertical ports 64 (Figs. 1 and 6). A series of cored openings 65 formed in the upper portion of the finishing mold 18 (Fig. 8) permits exhaust of the cooling air from the chamber 25.

Because of the fixed relation between the adapter 30 and the circular flange 44 about which the body blank and finishing molds close in alternation, accurate alignment of the neck mold with the blank mold 16 and finishing mold 18 in alternation is assured. This prevents the formation of articles of glassware such as bottles with offset neck portions. Proper vacuum conditions may be readily maintained in the chamber 25 because of the sealing contact between the body blank mold 16 and the flange 44 and between the cap plate 38 and the upper side of the chamber 25. This construction materially decreases the number of points at which outside air may enter the vacuum chamber and contributes greatly to the maintenance of proper vacuum conditions in the chamber.

During the final expansion of the blank or parison in the finishing mold 18 (Figs. 6 and 8), at which time the blow slide 39 is positioned over the opening 29, cooling air may be applied to the interior of the vacuum chamber 25 for the purpose of cooling the neck mold 15 and parts associated therewith. Such application of cooling air may be started at any time after positioning of the blow slide as shown in Fig. 6 and may be continued until after movement of the finishing mold 18 away from said chamber.

Modifications may be resorted to within the spirit and scope of the appended claims.

What we claim is:

1. In a glassware forming machine, the combination of a partible neck mold, mechanism for opening and closing the neck mold, a housing surrounding and spaced from the neck mold to provide a chamber enclosing the neck mold, and means to exhaust air from said chamber and neck mold at regular time intervals.

2. In a glassware forming machine, the combination of a partible neck mold, mechanism for opening and closing the neck mold, a housing surrounding and spaced from the neck mold to provide a chamber enclosing the neck mold and partly enclosing the operating mechanism therefor, said housing having a circular opening in its lower side defined by a continuous depending flange, said flange adapted for sealing contact with a blank mold and finishing mold in alternation, and means to exhaust air from said chamber and neck mold at regular time intervals.

3. In a glassware forming machine, the combination of a partible neck mold, mechanism for opening and closing the neck mold, a housing surrounding and spaced from the neck mold to provide a chamber enclosing the neck mold and part of said mechanism, said housing having a circular opening in its lower side concentric with the neck mold, an annular depending flange extending about said opening, a partible blank mold adapted to close about said flange and seal the opening in the housing, and means to exhaust air from the housing, neck and blank molds at regular time intervals.

4. In combination, a partible neck mold, partible blank and finishing molds adapted to cooperate in alternation with the neck mold at regular time intervals, a housing surrounding and spaced from the neck mold and providing a chamber enclosing the sides and top portion of the neck mold, an annular flange depending from the lower side of the housing and adapted for sealing contact alternately with said blank and finishing molds, means to exhaust air from the housing and neck and blank molds at regular time intervals, and means to supply air under pressure to the neck and finishing molds periodically.

5. In a glassware forming machine, a neck mold, a housing surrounding the mold and spaced from the sides and top of the mold, said housing having an opening in its lower side concentric with the mold, an annular flange depending from the wall of said opening, partible blank and finishing molds, and shoulders on the upper sides of the blank and finishing molds adapted for sealing contact with said annular flange.

6. In combination, a neck mold, a body blank mold adapted for register therewith, a housing spaced from and enclosing the neck mold and adapted for engagement with the body blank mold, and means to exhaust air from the molds and said housing.

7. In combination, a neck mold, a body blank mold adapted for register therewith, a housing spaced from and enclosing the neck mold and having an open lower side adapted to be enclosed by the body blank mold when the latter registers with the neck mold, and means to exhaust the air from the molds and said housing.

8. In combination, a neck mold, a body blank mold adapted for register therewith at times, a housing spaced from and enclosing the neck mold and having a circular opening in its lower side, a depending continuous flange extending about said opening, a shoulder formed on the body blank mold and adapted to have a sealing contact with said flange, and means to exhaust the air from said housing and molds.

9. In combination, a neck mold, a housing surrounding and spaced from the neck mold, said housing having a pair of vertically aligned openings providing a passageway extending vertically through said housing, an adapter ring arranged in the upper opening and projecting into said housing, a partible neck mold in the housing adapted to close about said adapter, a body mold arranged to close the lower opening and register with the neck mold and adapter ring, and means to close the upper opening.

10. In combination, a neck mold, a housing surrounding and spaced from the neck mold, said housing having a pair of vertically aligned openings providing a passageway extending vertically through said housing, an adapter ring arranged in the upper opening and projecting into said housing, a partible neck mold in the housing adapted to close about said adapter, a body blank mold arranged to close the lower opening and register with the neck mold and adapter ring, means to close the upper opening, and means to exhaust the air from said housing and molds.

11. In combination, a neck mold, a housing surrounding and spaced from the neck mold, said housing having a pair of vertically aligned openings providing a passageway extending vertically through said housing, an adapter ring arranged in the upper opening and projecting into said housing, a partible neck mold in the housing adapted to close about said adapter, a plunger movable into and out of the neck mold through said adapter ring and the upper opening, a cap plate supporting said plunger and adapted at times to close the upper opening, and a body blank mold movable into position to close the lower opening at times.

12. In combination, a partible neck mold, a partible body blank mold therebeneath, means to bring said molds into register at regular time intervals, a housing spaced from and enclosing the neck mold and having a bottom opening closed by contact of the walls of the housing with the upper end of the body blank mold when the body blank mold and neck mold are in register, and centering devices carried in part by said housing, adapted to bring said molds into vertical alignment.

13. In combination, a partible neck mold, a partible body blank mold therebeneath, means to bring said molds into register at regular time intervals, a housing spaced from and enclosing the neck mold and having a bottom opening closed by contact of the walls of the housing with the upper end of the body blank mold when the body blank mold and neck mold are in register, centering devices carried in part by said chamber, adapted to bring said molds into vertical alignment, means to exhaust the air from the housing and molds, means to open the body blank mold, and means to then apply cooling air to the interior of said housing and to the neck mold.

Signed at Toledo, Ohio, this 6th day of July, 1929.

AUGUST KADOW.
THOMAS A. BRAGG.